United States Patent
Gao et al.

[11] Patent Number: 6,132,048
[45] Date of Patent: Oct. 17, 2000

[54] SINGLE DISPLAY ASSEMBLY HAVING SELECTIVE REFLECTORS TO VIEW INDICIA

[75] Inventors: Qi Gao; Stefan Peana, both of Singapore, Singapore

[73] Assignee: Motorola, Schaumburg, Ill.

[21] Appl. No.: 09/393,282

[22] Filed: Sep. 10, 1999

[51] Int. Cl.[7] .......................... G03B 21/28; G02F 1/1335
[52] U.S. Cl. .................. 353/20; 349/61; 349/62; 353/122; 359/15
[58] Field of Search ............................ 353/20, 120, 122, 353/DIG. 3; 349/61, 16, 62, 162, 113; 359/15

[56] References Cited

U.S. PATENT DOCUMENTS

| | | | |
|---|---|---|---|
| 5,115,228 | 5/1992 | Harris et al. | |
| 5,353,075 | 10/1994 | Conner et al. | 353/122 |
| 5,712,694 | 1/1998 | Taira et al. | 349/62 |
| 5,812,229 | 9/1998 | Chen et al. | 349/117 |
| 5,828,488 | 10/1998 | Ouderkirk et al. | 349/62 |
| 5,853,240 | 12/1998 | Tanaka et al. | 353/20 |
| 6,044,196 | 3/2000 | Winston et al. | 349/61 |

*Primary Examiner*—William Dowling
*Attorney, Agent, or Firm*—Philip P. Macnak

[57] ABSTRACT

A single display assembly (10) has an electronically controllable display (11) with a plurality of display elements (12) and sandwiched by two support plates (13,14), two polarizers (15,16) and two selective reflectors, namely a first selective reflector (17) and a second selective reflector (18). Support plates (13,14) and polarizers (15,16) are transparent media to permit passage of light. Selective reflectors (17,18) are holographic reflectors that are each pre-recorded with characteristics that includes a range (19 or 20) of predetermined incident angles relative to inward facing horizontal surfaces (24,25) and an angular transparency range (not shown) for passage of light. Assembly (10) has two opposite sides (21,22) to view indicia provided by display elements (12). Indicia can be selectively viewed from either of sides (21 or 22) without interference from external background of a remaining one of sides (21 or 22).

9 Claims, 2 Drawing Sheets

SINGLE DISPLAY ASSEMBLY HAVING SELECTIVE REFLECTORS TO VIEW INDICIA

FIELD OF THE INVENTION

This invention relates to display assemblies for electronic display devices. In particular, this invention relates to, but is not necessarily limited to, a single display assembly having selective reflectors to view indicia.

BACKGROUND OF THE INVENTION

Display assemblies of electronic display devices that provide indicia using display elements such as liquid crystals are known. For example, indicia are provided in a conventional liquid crystal display (LCD) assembly by selectively actuating liquid crystals to control passage of light. Such a conventional LCD assembly includes transparent media, such as glass or plastics, to sandwich one or more layers of such liquid crystals.

Light required to form the indicia with liquid crystals has to pass through the liquid crystals to a viewer. Such light is typically provided with either a light source or ambient light. The light source can placed to the rear of an LCD assembly so that the light generated can pass through the liquid crystals of the LCD assembly to the viewer. Such a light source provides what is commonly referred to as backlighting. Alternatively, the light source can be placed in front of the liquid crystals. Placed as such to provide frontlighting, which is similar to how ambient light is provided, the light that is generated has to pass through the liquid crystals to be reflected back to the viewer. With frontlighting or ambient light, the LCD assembly requires a reflector, placed on the other side of the liquid crystals relative to the light source, to reflect the light back to the viewer.

Viewing from both sides of an LCD assembly is desirable in applications such as, for example, a portable electronic device that is folded to reduce its size when not in use. For such applications, being viewable from an opposite side enables a user to preview indicia without having to unfold the portable electronic device. However, a problem with viewing a conventional LCD assembly from opposite sides is that the LCD assembly must then permit passage of light through both opposite sides and, as such, external background not related to the indicia on one side can then be seen from an opposite side. Such background is undesirable because it tends to interfere with viewing from the opposite side. Conventional reflectors to block the external background on one side does not overcome this problem as these will also block incident light required to view indicia from that one side.

To overcome the above problem, U.S. Pat. No. 5,115,228 describes electronic shutters of liquid crystal emulsion flashing rapidly to enable viewing of information from opposite surfaces of a display. However, such electronic shutters require complex driving circuitry to control timing of the flashing and to process the information. Providing two separate LCD assemblies may solve the problem but substantially increases the cost of the assembly and, furthermore, additional space is required which is undesirable for use in, for example, portable electronic devices. Hence, a need exists for a single display assembly to provide indicia that are viewable from opposite sides without requiring relatively complex driving circuitry or additional costs.

SUMMARY OF THE INVENTION

According to one aspect of the invention, there is provided a single display assembly having selective reflectors, said assembly comprising:

an electronically controllable display; and at least two selective reflectors including a first selective reflector and a second selective reflector, said display being sandwiched by said selective reflectors, wherein incident light passing through said first selective reflector and said display is reflected back by said second selective reflector through said display and said first selective reflector, said incident light being received within a range of predetermined incident angles relative to an inward facing horizontal surface of said first selective reflector.

BRIEF DESCRIPTION OF THE DRAWINGS

In order to describe the invention and to put it into practical effect, reference will now be made to preferred and alternate embodiments of the invention as illustrated with reference to the accompanying drawings in which.

DETAILED DESCRIPTION OF THE INVENTION

Figure 1:
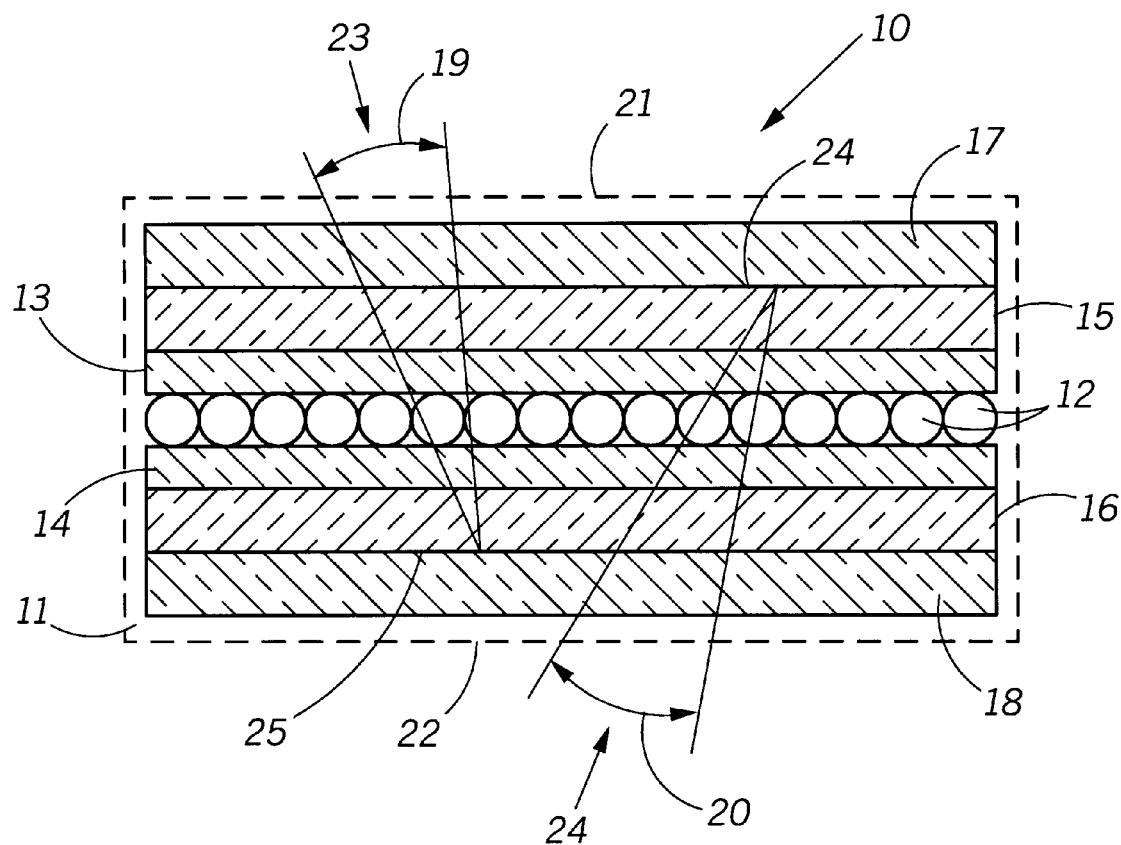
FIG. 1 shows a cross-section of part of a display assembly in accordance with a preferred embodiment of the invention.

Referring to FIG. 1, a cross-section of part of a single display assembly 10 is shown in accordance with a preferred embodiment of the invention. Assembly 10 comprises an electronically controllable display 11 having a plurality of display elements 12 and sandwiched by two support plates 13,14. The display is further sandwiched by two polarizers 15,16. There are also two selective reflectors, namely a first selective reflector 17 and a second selective reflector 18, that sandwich display 11, plates 13,14 and polarizers 15,16. Support plates 13,14 and polarizers 15,16 are transparent media to permit passage of light and are made of either glass or plastics. Selective reflectors 17,18 can be, for example, holographic reflectors that are each pre-recorded with characteristics that includes a range 19 or 20 of predetermined incident angles and an angular transparency range (not shown) for passage of light. As is known in the art, the angular transparency range is based on angular characteristics of transparency of selective reflectors 17,18 and complements predetermined incident angles to enable viewing through selective reflectors 17,18. Assembly 10 has two opposite sides 21,22 to view indicia provided by the plurality of display elements 12.

Display 11 provides indicia in response to driving signals from a display driver (not shown). These driving signals actuate the plurality of display elements 12 that can be, for example, liquid crystals. As is known in the art, such liquid crystals are oriented in specific directions to block or to permit passage of light when voltage driving signals are provided.

Viewing of indicia provided by display 11 through side 21 will now be explained using incident light entering assembly 10 in a direction indicated by an arrow 23. Incident light that is received within range 19 of predetermined incident angles passes through selective reflector 17 and display 11. Thereafter, the incident light is reflected back by selective reflector 18 through display 11 and selective reflector 17 to a user of assembly 10. For viewing through side 21, reflection of the incident light is within the angular transparency range of selective reflector 17. Thus, range 19 of predetermined incident angles relates to selective reflector 18 and is associated with the angular transparency range of selective reflector 17 so that the user can view the indicia provided by display 11.

As with viewing the indicia through side 21, viewing of the indicia through side 22 also requires incident light to enter assembly 10 and be reflected back to a viewer. However, for viewing through side 22, the incident light has to be within range 20 of predetermined incident angles and in a direction indicated by an arrow 24. This incident light goes through selective reflector 18 and display 11 before being reflected back through display 11 and selective reflector 18 by selective reflector 17. For viewing through side 22, reflection of the incident light is within the angular transparency range of reflector selective 18. Thus, range 20 of predetermined incident angles relates to selective reflector 17 and is associated with the angular transparency range of selective reflector 18 so that the viewer can view the indicia provided by display 11.

It is to be noted that ranges 19,20 of predetermined incident angles are illustratively shown in FIG. 1 and are not meant to be angled relative to respective inward facing horizontal surfaces 24,25 of selective reflectors 17,18 as shown. Also these ranges 19,20 of predetermined incident angles will depend on viewing requirements as determined in accordance with use of assembly 10. Typical ranges for desirable viewing are from ten to fifteen degrees. Hence, for a portable electronic display device in which viewing from opposite sides is desirable, ranges 19,20 of predetermined incident angles can be selectively predetermined and suitably angled relative to horizontal surfaces 24,25 so that a user can view the indicia without having to hold the portable electronic device at awkward angles or positions.

Figure 2:
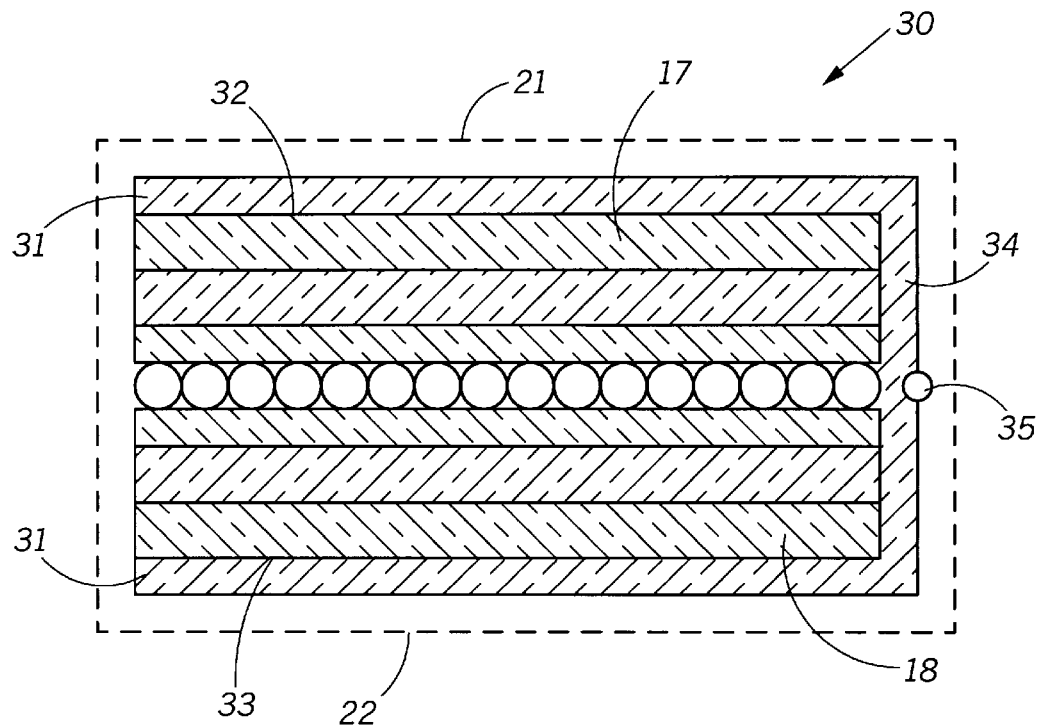
FIG. 2 shows a cross-section of part of a display assembly in accordance with a first alternate embodiment of the invention.
Figure 3:
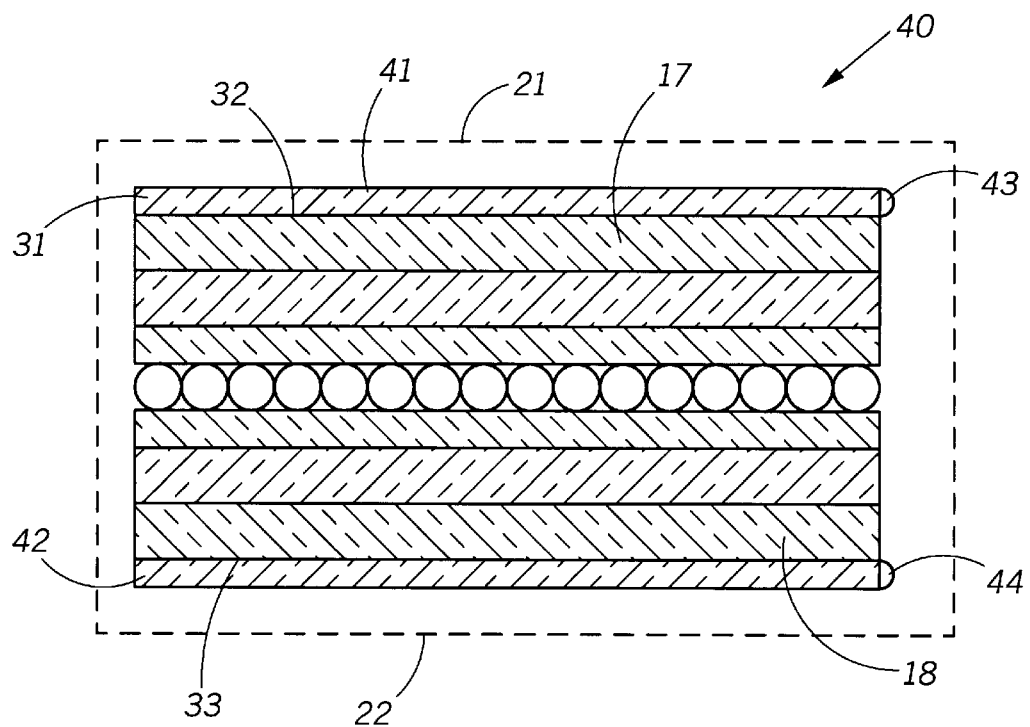
FIG. 3 shows a cross-section of part of a display assembly in accordance with a second alternate embodiment of the invention.

Referring now to FIGS. 2 and 3, a first alternate embodiment 30 and a second alternate embodiment 40 of the invention are respectively shown. In these alternate embodiments 30,40, assembly 10 further comprises at least one light guide having at least one light source respectively coupled thereto. The light guide and the light source provide illumination of display 10 in the absence of ambient light. In alternate embodiment 30, selective reflectors 17,18 are sandwiched by a light guide 31 at their respective outward facing horizontal surfaces 32,33. Light guide 31 is a single piece having an intermediate portion 34 and a light source 35 to provide light. In alternate embodiment 40, two light guides 41,42 sandwich selective reflectors 17,18 at horizontal surfaces 32,33 respectively. Light sources 43,44 respectively couples to light guides 41,42 to provide light.

Advantageously, the present invention enables indicia provided by display 11 to be viewed from opposite sides 21,22 using assembly 10. Unlike conventional reflectors, reflectors 17,18 can selective permit passage of incident light while reflecting back other incident light not within their respective ranges 19,20 of predetermined incident angles. Hence, external background on side 21 that is not related to the indicia can be alleviated when viewing such indicia from side 22. This is because reflector 17 will then block off most of the external background. Assembly 10 will similarly alleviate external background on side 22 when viewing indicia from side 21.

Furthermore, because each of the ranges 19,20 of predetermined incident angles has an associated angular transparency range for viewing from a respective one of sides 21,22, only a user who is positioned within the associated angular transparency range can view the indicia. Thus, the present invention advantageously provides some degree of privacy when viewing the indicia from either of sides 21,22.

Additionally, the present invention does not require relatively complex driving circuitry or substantially additional costs from using two separate display assemblies as assembly 11 uses only display 11 to provide indicia.

It is further to be noted that although the display driver is not shown, such a driver will be able to determine appropriate driving signals to format the indicia when viewing from either of sides 21,22. Such formatting is well known in the art and is easily accomplished by software algorithms and sensors that determine relative position of assembly 10. Hence, indicia currently displayed for one of the sides 21,22 can be re-formatted for displaying on the other one of sides 21,22.

Although the invention has been described with reference to the above embodiments, it is to be understood that the invention is not restricted to the embodiments described herein.

What is claimed is:

1. A single display assembly having selective reflectors, said assembly comprising:
   an electronically controllable display; and
   at least two selective reflectors including a first selective reflector and a second selective reflector, said display being sandwiched by said selective reflectors,
   wherein incident light passing through said first selective reflector and said display is reflected back by said second selective reflector through said display and said first selective reflector, said incident light being received within a range of predetermined incident angles relative to an inward facing horizontal surface of said first selective reflector.

2. The assembly as claimed in claim 1 wherein incident light passing through said second selective reflector and said display is reflected back by said first selective reflector through said display and said second selective reflector, said incident light being received within a range of predetermined incident angles relative to an inward facing horizontal surface of said second selective reflector.

3. The assembly as claimed in claim 1 wherein one of said selective reflectors has an angular transparency range associated with said range of predetermined incident angles of the other of said reflectors.

4. The assembly as claimed in claim 1 wherein said selective reflectors are holographic reflectors.

5. The assembly as claimed in claim 1 wherein each of said holographic reflectors comprises one or more layers of holographic elements.

6. The assembly as claimed in claim 1 and further comprising at least two transparent media.

7. The assembly as claimed in claim 6 wherein said transparent media includes polarizers.

8. The assembly as claimed in claim 6 wherein said transparent media include support plates.

9. The assembly as claimed in claim 1 and further comprising at least one light guide having at least one light source respectively coupled thereto, said selective reflectors being sandwiched by said at least one light guide.

* * * * *